(12) United States Patent
Tsunoda et al.

(10) Patent No.: US 9,406,953 B2
(45) Date of Patent: Aug. 2, 2016

(54) FUEL CELL STACK

(75) Inventors: Tadashi Tsunoda, Wako (JP); Yuki Yoshimine, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 483 days.

(21) Appl. No.: 13/989,627

(22) PCT Filed: Feb. 20, 2012

(86) PCT No.: PCT/JP2012/054680
§ 371 (c)(1),
(2), (4) Date: May 24, 2013

(87) PCT Pub. No.: WO2012/117983
PCT Pub. Date: Sep. 7, 2012

(65) Prior Publication Data
US 2013/0252127 A1    Sep. 26, 2013

(30) Foreign Application Priority Data
Mar. 2, 2011  (JP) ................. 2011-044563

(51) Int. Cl.
*H01M 8/04* (2016.01)
*H01M 8/24* (2016.01)
(Continued)

(52) U.S. Cl.
CPC ........ *H01M 8/04201* (2013.01); *H01M 8/0228* (2013.01); *H01M 8/0247* (2013.01);
(Continued)

(58) Field of Classification Search
CPC .......... H01M 8/04201; H01M 8/2465; H01M 8/0228; H01M 8/0247; H01M 8/0258; H01M 8/0271; H01M 8/2425; H01M 8/2485
See application file for complete search history.

(56) References Cited

U.S. PATENT DOCUMENTS

| 5,084,364 A | 1/1992 | Quaadvliet |
| 7,670,710 B2 | 3/2010 | Tsunoda |

(Continued)

FOREIGN PATENT DOCUMENTS

| JP | 03-057162 | 3/1991 |
| JP | 2005-183079 | 7/2005 |

(Continued)

OTHER PUBLICATIONS

European Office Action dated Feb. 26, 2015, 6 pages.
(Continued)

*Primary Examiner* — Kenneth Douyette
(74) *Attorney, Agent, or Firm* — Rankin, Hill & Clark LLP (57) ABSTRACT

A fuel cell stack includes a first separator and a second separator. The first separator includes a first sandwiching section for sandwiching an electrolyte electrode assembly, a fuel gas supply section, and a first bridge section. A fuel gas supply passage extends through the fuel gas supply section in the stacking direction. The second separator includes a second sandwiching section for sandwiching the electrolyte electrode assembly, an oxygen-containing gas supply section, and a second bridge section. An oxygen-containing gas supply passage extends through the oxygen-containing gas supply section. A first displacement absorbing mechanism, a second displacement absorbing mechanism, a third displacement absorbing mechanism and a fourth displacement absorbing mechanism are provided in the fuel gas supply section, the oxygen-containing gas supply section, the first sandwiching section and the second sandwiching section for absorbing displacement generated in the fuel cell stack.

4 Claims, 11 Drawing Sheets

(51) Int. Cl.
*H01M 8/02* (2016.01)
*H01M 8/12* (2016.01)

(52) U.S. Cl.
CPC .......... *H01M8/0258* (2013.01); *H01M 8/0271* (2013.01); *H01M 8/248* (2013.01); *H01M 8/2425* (2013.01); *H01M 8/2465* (2013.01); *H01M 8/2485* (2013.01); *H01M 2008/1293* (2013.01); *Y02E 60/50* (2013.01); *Y02E 60/525* (2013.01)

(56) References Cited

U.S. PATENT DOCUMENTS

| | | | |
|---|---|---|---|
| 8,323,853 B2 | 12/2012 | Ogawa et al. | |
| 2004/0209127 A1* | 10/2004 | Wang | H01M 8/04029 73/40.7 |
| 2005/0136294 A1 | 6/2005 | Tsunoda | |
| 2006/0134499 A1 | 6/2006 | Homma | |
| 2007/0116998 A1 | 5/2007 | Kuznecov et al. | |
| 2008/0096085 A1 | 4/2008 | Tsunoda | |
| 2009/0305104 A1* | 12/2009 | Matsumoto | H01M 8/0273 429/434 |
| 2009/0311573 A1* | 12/2009 | Dan | H01M 8/0247 429/454 |
| 2010/0099003 A1* | 4/2010 | Ogawa | H01M 8/0228 429/458 |
| 2011/0003230 A1* | 1/2011 | Ozgur | H01M 8/241 429/470 |
| 2011/0151348 A1 | 6/2011 | Murakami et al. | |

FOREIGN PATENT DOCUMENTS

| | | |
|---|---|---|
| JP | 2006-120589 | 5/2006 |
| JP | 2006-179283 | 7/2006 |
| JP | 2006-339035 | 12/2006 |
| JP | 2007-317490 | 12/2007 |
| JP | 2008-041303 | 2/2008 |
| JP | 2008-103210 | 5/2008 |
| JP | 2008-103211 | 5/2008 |
| JP | 4087216 | 5/2008 |
| JP | 4291299 | 7/2009 |
| JP | 2010-067453 | 3/2010 |

OTHER PUBLICATIONS

Japanese Office Action, JP Application No. 2011-044563 with partial English translation, dated Sep. 16, 2014, 4 pages.
This application is co-pending with U.S. Appl. No. 13/989,620, filed in the United States Patent and Trademark Office on May 24, 2013.

* cited by examiner

FUEL CELL STACK

TECHNICAL FIELD

The present invention relates to a fuel cell stack formed by stacking a plurality of fuel cells. Each of the fuel cells is formed by sandwiching an electrolyte electrode assembly between a first separator and a second separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, predetermined numbers of the electrolyte electrode assemblies and the separators are stacked together to form a fuel cell stack.

In the fuel cell, it is required to supply a fuel gas (e.g., hydrogen-gas) to the anode of the electrolyte electrode assembly and an oxygen-containing gas (e.g., the air) to the cathode of the electrolyte electrode assembly. The fuel gas and the oxygen-containing gas also need to be supplied to each of the fuel cells.

Figure 10:
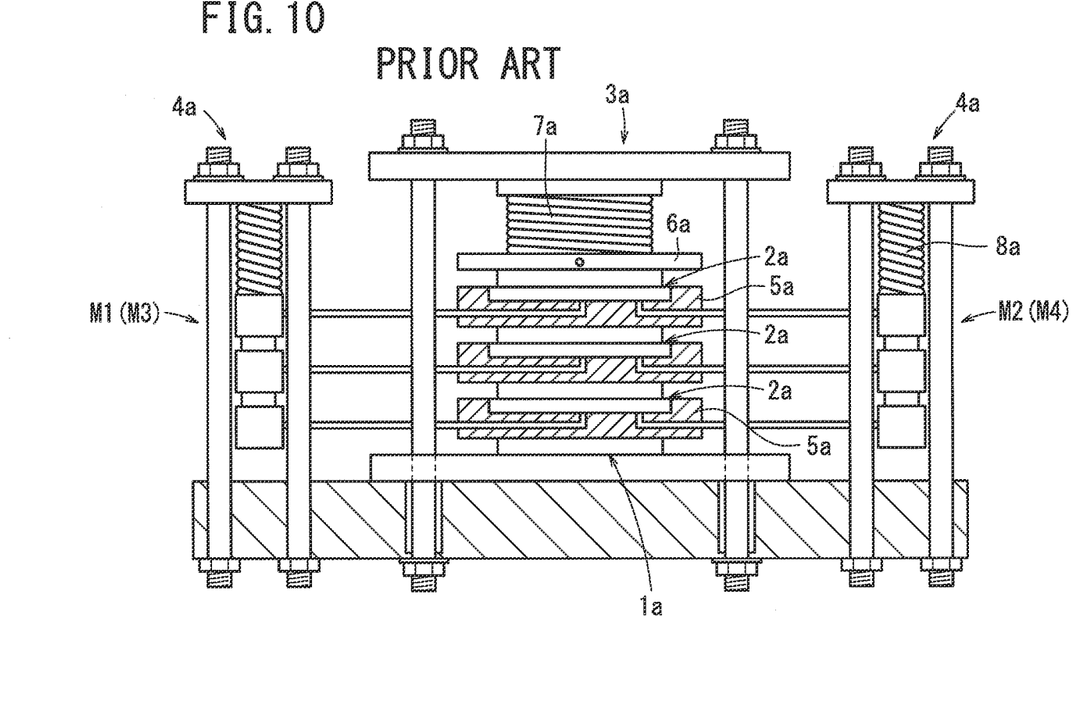
FIG. 10 is a cross sectional view showing a flat plate type solid oxide fuel cell according to Conventional Technique 1.

As the fuel cell of this type, for example, a flat plate type solid oxide fuel cell as disclosed in Japanese Patent No. 4291299 (hereinafter referred to as Conventional Technique 1) is known. The fuel cell includes, as shown in FIG. 10, a cell stack $1a$, and four manifolds M1 to M4 provided around the cell stack $1a$. The manifolds M1 to M4 supply, and discharge the fuel gas and the oxygen-containing gas to and from each of unit cells $2a$. In the fuel cell, a pressure is applied to the cell stack $1a$ by a first pressure applying mechanism $3a$, and a pressure is applied to each of the manifolds M1 to M4 by a second pressure applying mechanism $4a$.

The cell stack $1a$ is formed by stacking the unit cells $2a$ and interconnectors $5a$ alternately. The manifold M1 serves as a fuel gas supply manifold for supplying the fuel gas to the cell stack $1a$, and the manifold M2 serves as a discharge manifold for discharging the fuel gas from the cell stack $1a$. The manifold M3 serves as an oxygen-containing gas supply manifold for supplying the oxygen-containing gas to the cell stack $1a$, and the manifold M4 serves as a discharge manifold for discharging the oxygen-containing gas from the cell stack $1a$.

The first pressure applying mechanism $3a$ includes a holder plate $6a$ and a compression spring $7a$ provided on the cell stack $1a$. The second pressure applying mechanism $4a$ includes compression springs $8a$ provided on the manifolds M1 to M4.

Figure 11:
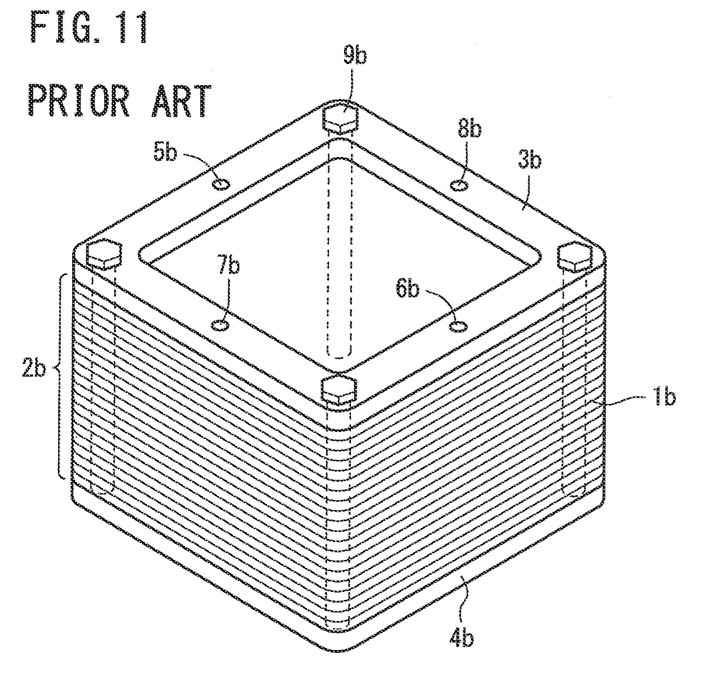
FIG. 11 is a perspective view showing a solid oxide fuel cell stack according to Conventional Technique 2.

Further, as shown in FIG. 11, a solid oxide fuel cell stack disclosed in Japanese Laid-Open Patent Publication No. 2007-317490 (hereinafter referred to as Conventional Technique 2) includes a stack body $2b$ formed by stacking a plurality of solid oxide fuel cells $1b$ in a stacking direction, and a pair of outer support members $3b$, $4b$ provided on both sides of the stack body $2b$ in the stacking direction.

The fuel cell stack has a fuel gas supply hole $5b$ for supplying the fuel gas, a fuel gas discharge hole $6b$ for discharging the fuel gas, an air supply hole $7b$ for supplying the air, and an air discharge hole $8b$ for discharging the air. The holes $5b$ to $8b$ in the fuel cell stack make up an internal manifold.

Bolts $9b$ are tightly screwed into nuts (not shown) to tighten the outer support members $3b$, $4b$ inwardly in the stacking direction. Thus, the stack body $2b$ is pressed inwardly by the outer support members $3b$, $4b$, and components of the fuel cell stack are fixed together.

SUMMARY OF INVENTION

The SOFC is operated at considerably high temperature. Therefore, it takes long time to launch the fuel cell into steady power generation. Therefore, it is desired to reduce the time required for starting the operation of the fuel cell. For this purpose, in particular, at the time of starting operation, the temperature of the fuel cell could be raised rapidly. However, in this case, temperature difference may occur between components or portions of the fuel cell, and rapid distortion or deformation may occur by heat displacement easily.

In this regard, in the conventional technique 1, the cell stack $1a$ is tightened by the first pressure applying mechanism $3a$, and the manifolds M1 to M4 are tightened by the second pressure applying mechanism $4a$. In the structure, components such as the interconnectors $5a$ (separators) and the MEAs may be damaged undesirably.

Further, in the conventional technique 2, when the temperature of the fuel cell stack is raised rapidly, if rapid displacement occurs, since the stack body $2b$ is pressed inwardly by the outer support members $3b$, $4b$ using the bolts $9b$, distortion cannot be absorbed (relaxed). Thus, the stack body $2b$ tends to be deformed easily.

The present invention has been made to solve the problems of this type, and an object of the present invention is to provide a fuel cell stack which makes it possible to reliably absorb heat displacement caused by rapid increase in the temperature of fuel cells, and prevent deformation of the stack as much as possible.

The present invention relates to a fuel cell stack formed by stacking a plurality of fuel cells in a stacking direction. Each of the fuel cells is formed by sandwiching an electrolyte electrode assembly between a first separator and a second separator. The electrolyte electrode assembly includes an anode, a cathode, and an electrolyte interposed between the anode and the cathode.

In the fuel cell stack, the first separator includes a first sandwiching section for sandwiching the electrolyte electrode assembly, a fuel gas supply section, and a first bridge section. A fuel gas channel for supplying a fuel gas along an electrode surface is formed in the first sandwiching section. A fuel gas supply passage for supplying the fuel gas to the fuel gas channel extends through the fuel gas supply section in the stacking direction. The first bridge section connects the first sandwiching section and the fuel gas supply section. A fuel gas supply channel is formed in the first bridge section for supplying the fuel gas from the fuel gas supply passage to the fuel gas channel.

The second separator includes a second sandwiching section for sandwiching the electrolyte electrode assembly, an oxygen-containing gas supply section, and a second bridge section. An oxygen-containing gas channel for supplying an oxygen-containing gas along an electrode surface is formed in the second sandwiching section. An oxygen-containing gas supply passage for supplying the oxygen-containing gas to the oxygen-containing gas channel extends through the oxygen-containing gas supply section in the stacking direction. The second bridge section connects the second sandwiching section and the oxygen-containing gas supply section. An oxygen-containing gas supply channel is formed in the second bridge section for supplying the oxygen-containing gas from the oxygen-containing gas supply passage to the oxygen-containing gas channel.

A displacement absorbing mechanism for absorbing displacement generated in the fuel cell stack is formed in each of the first sandwiching section, the second sandwiching section, the fuel gas supply section, and the oxygen-containing gas supply section.

In the present invention, displacement generated in the fuel cell stack can be absorbed by the displacement absorbing mechanism provided in each of the first sandwiching section, the second sandwiching section, the fuel gas supply section, and the oxygen-containing gas supply section. In the structure, rapid displacement that occurs when the temperature is raised rapidly can be absorbed effectively by the entire fuel cell stack. Therefore, generation of distortion in the stack is suppressed, and a desired current collection performance and sealing performance can be maintained suitably.

The above and other objects, features, and advantages of the present invention will become more apparent from the following description when taken in conjunction with the accompanying drawings in which a preferred embodiment of the present invention is shown by way of illustrative example.

DESCRIPTION OF EMBODIMENTS

Figure 1:
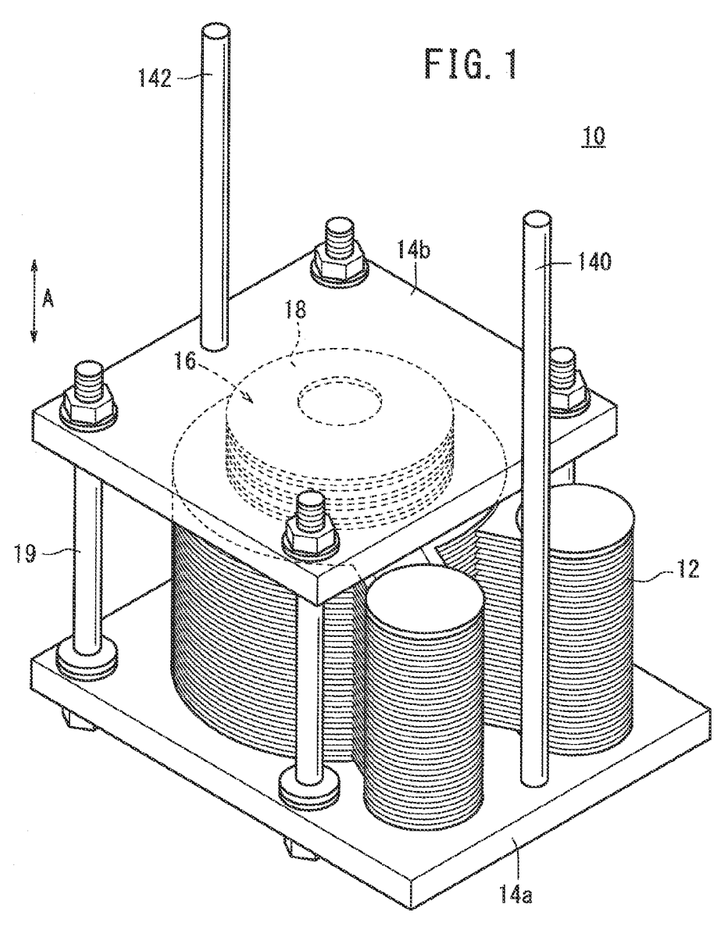
FIG. 1 is a perspective view schematically showing a fuel cell stack according to an embodiment of the present invention.
Figure 2:
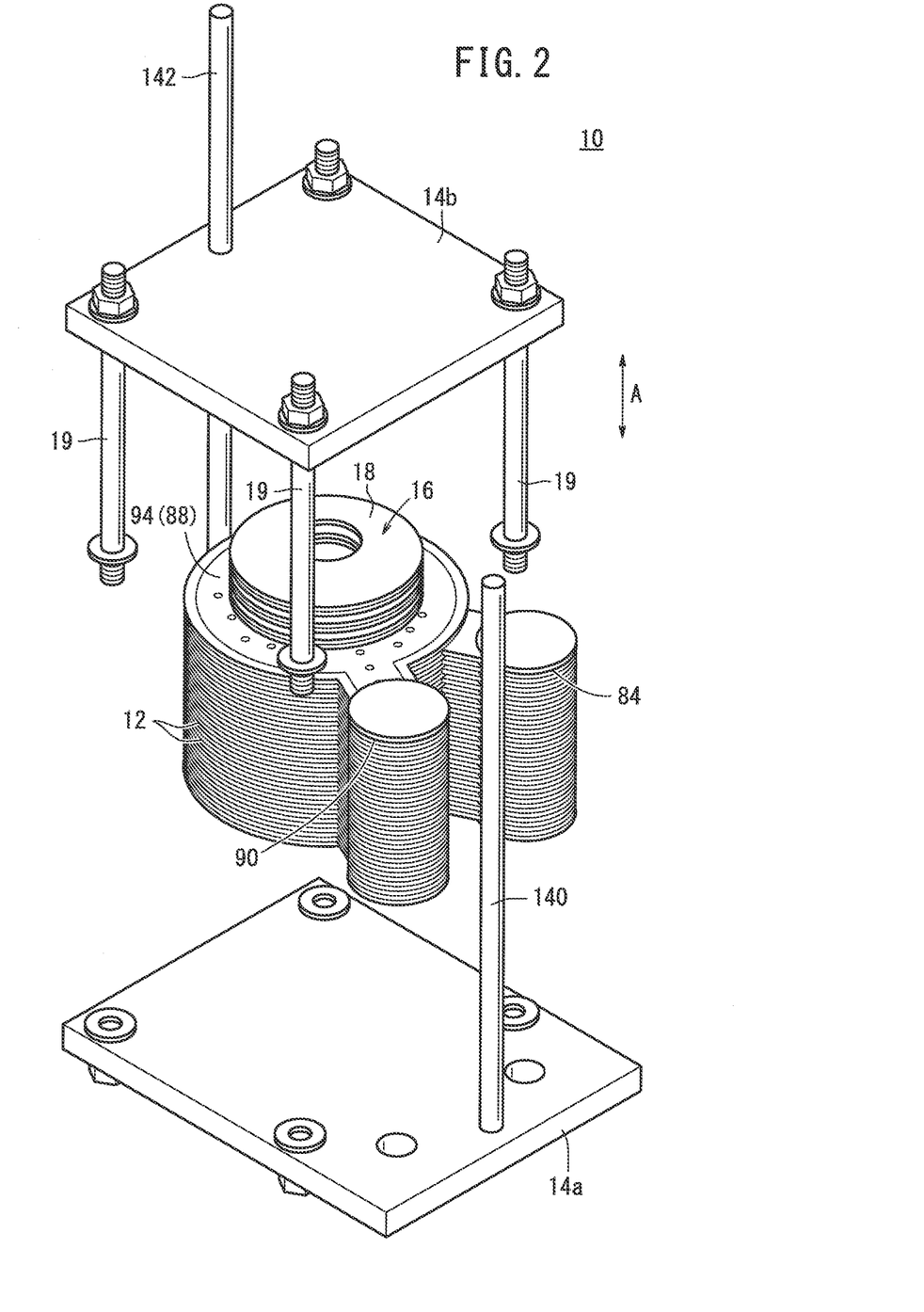
FIG. 2 is a partial exploded perspective view showing the fuel stack cell.

As shown in FIGS. 1 and 2, a fuel cell stack 10 according to an embodiment of the present invention comprises a stack body formed by stacking a plurality of fuel cells 12 in a direction indicated by an arrow A. The fuel cell stack 10 is used in various applications, including stationary and mobile applications. For example, the fuel cell stack 10 is mounted on a vehicle.

At one end of the fuel cell stack 10 in the stacking direction, a first plate member 14a is provided, and at the other end of the fuel cell stack 10 in the stacking direction, a second plate member 14b is provided. The second plate member 14b is smaller in size than the first plate member 14a, and as will be described later, the second plate member 14b is provided at a position corresponding to the first sandwiching sections 88 and the second sandwiching sections 94.

A spring member 18 of a load applying mechanism 16 is provided between the second plate member 14b and the first sandwiching sections 88 and the second sandwiching sections 94 for applying a load to the first sandwiching sections 88 and the second sandwiching sections 94 in the stacking direction. The second plate member 14b is fixed to the first plate member 14a using a plurality of bolt members (stud bolts) 19.

Figure 3:
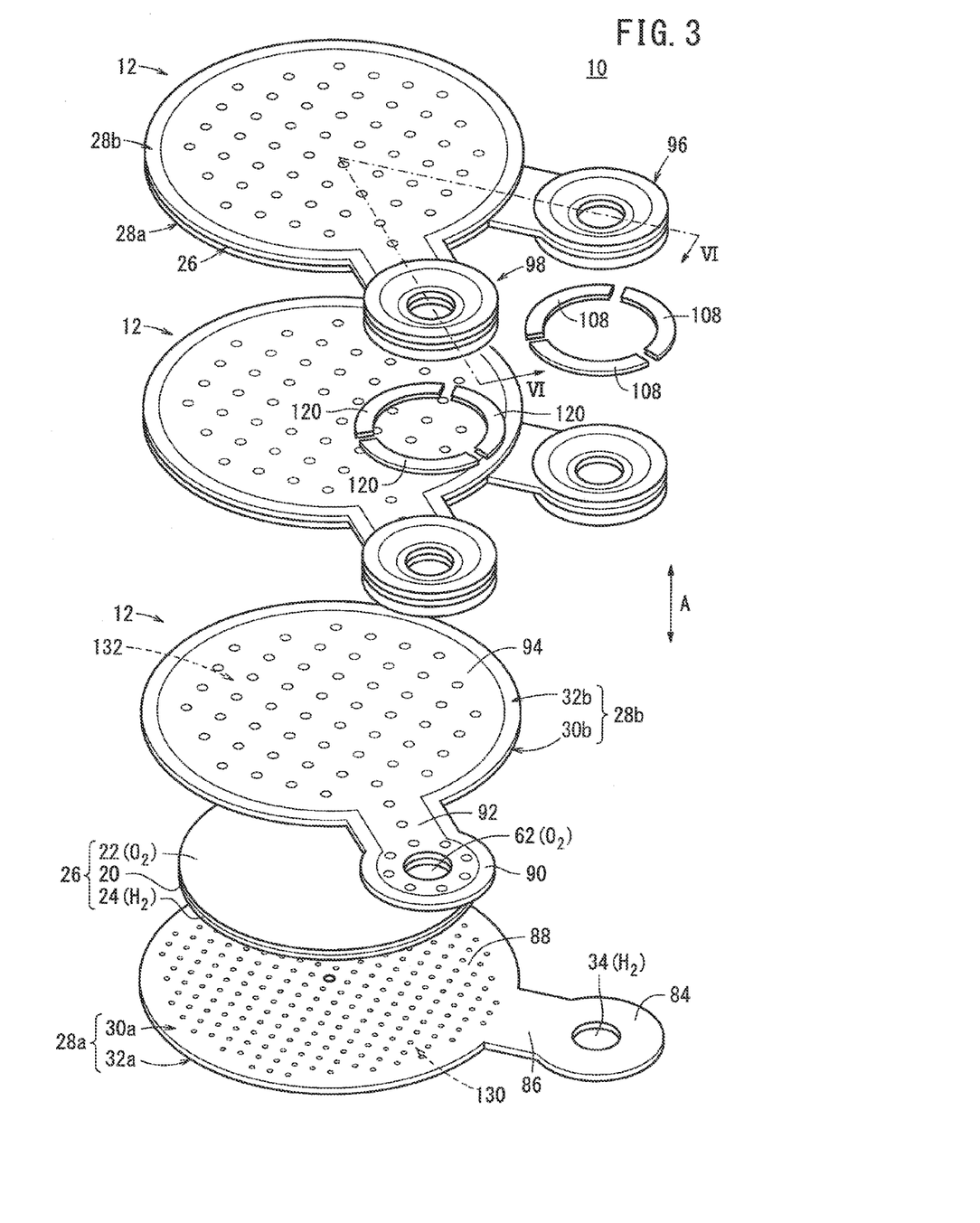
FIG. 3 is an exploded perspective view showing the fuel cell stack.
Figure 4:
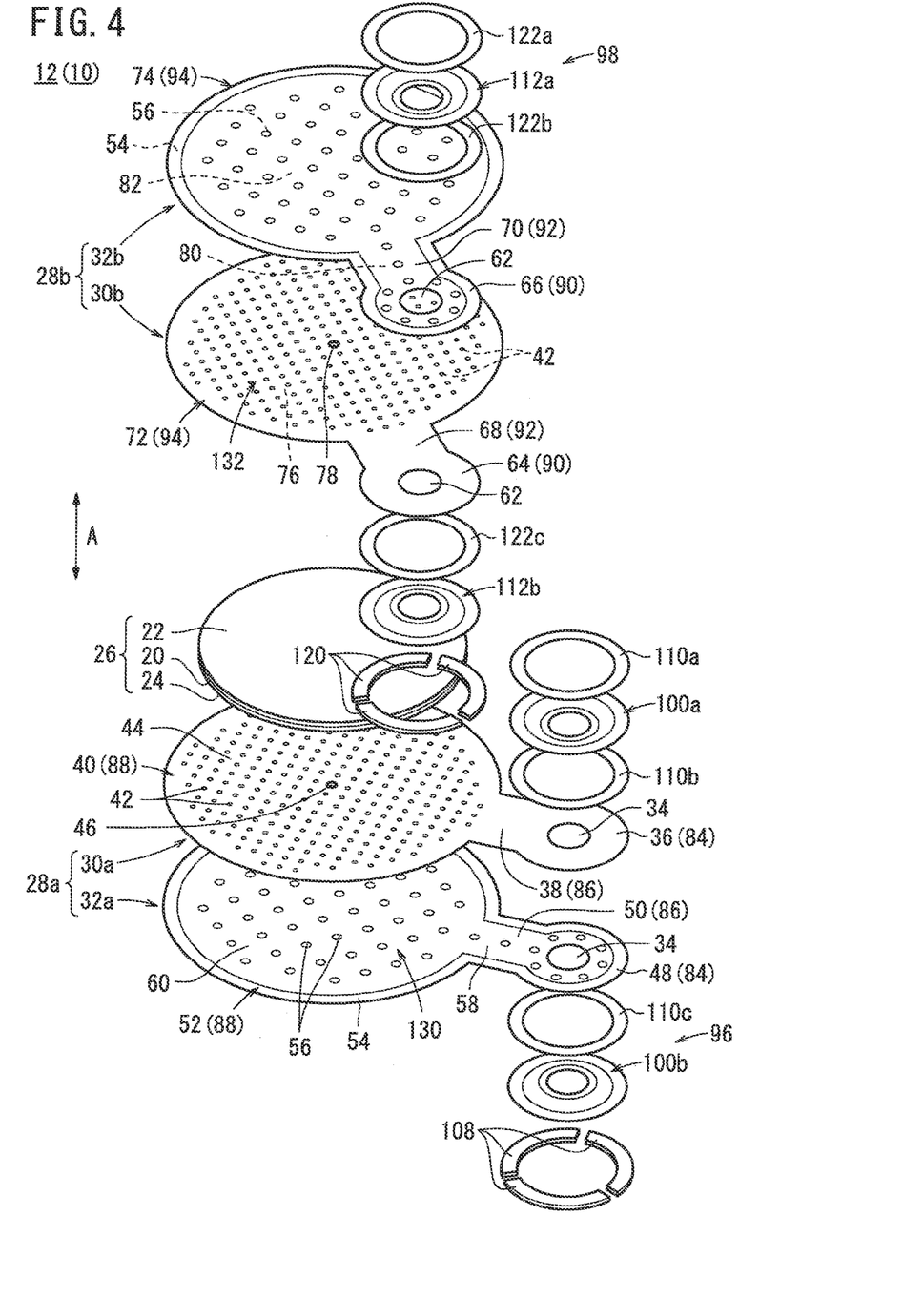
FIG. 4 is an exploded perspective view showing a fuel cell of the fuel cell stack.
Figure 5:
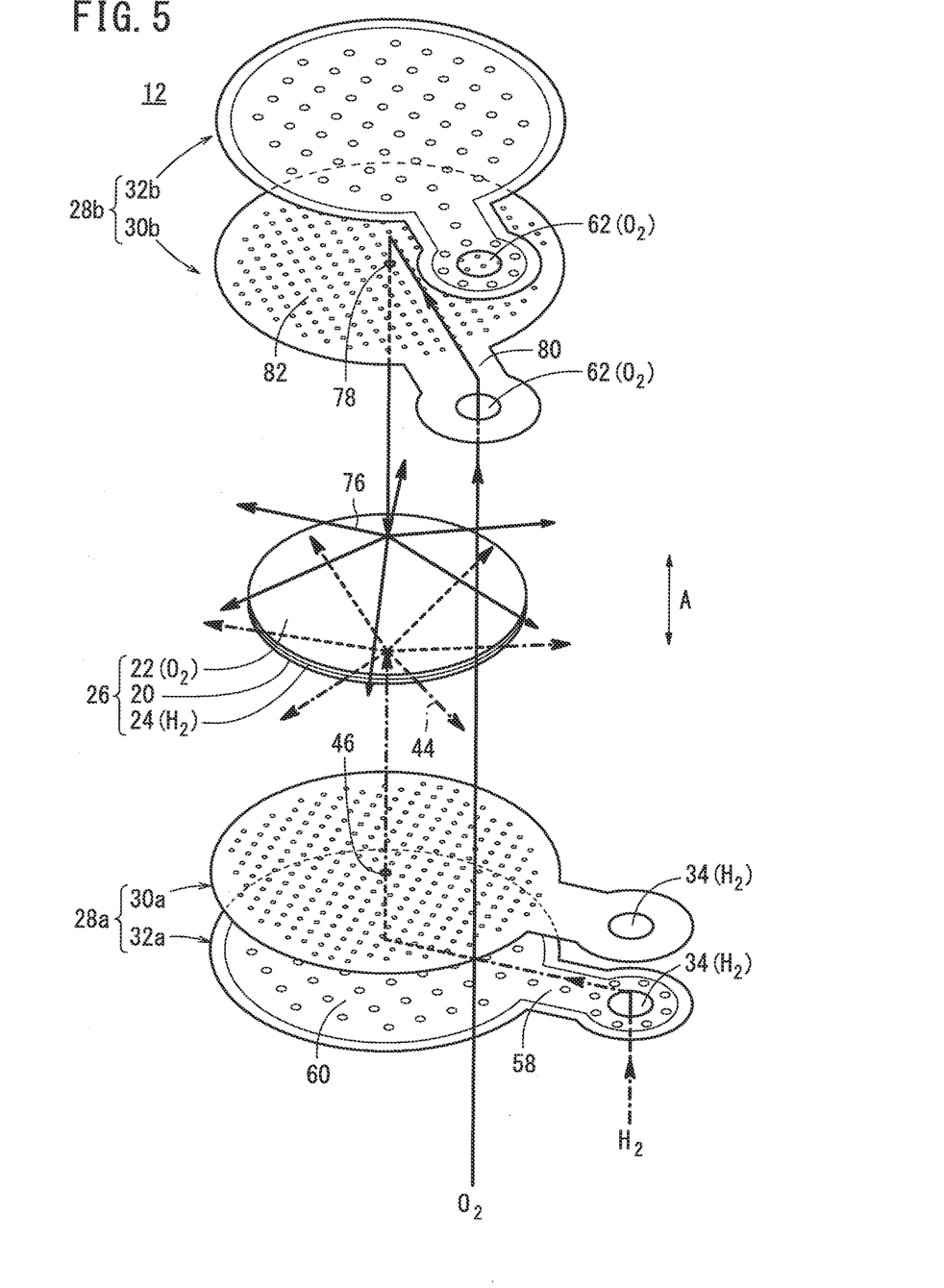
FIG. 5 is a view showing flows of reactant gases in the fuel cell stack.

The fuel cell 12 is a solid oxide fuel cell. As shown in FIGS. 3 to 5, the fuel cell 12 includes an electrolyte electrode assembly (MEA) 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the outer circumferential edge of the electrolyte electrode assembly 26 for preventing entry of exhaust gas (off gas) i.e., the oxygen-containing gas and the fuel gas after consumption in power generation reaction.

The fuel cell 12 is formed by sandwiching one electrolyte electrode assembly 26 between a first separator 28a and a second separator 28b. The first separator 28a and the second separator 28b comprise separator bodies having the same shape, and reversed 180° oppositely to each other.

The first separator 28a includes a first plate 30a and a second plate 32a. The first and second plates 30a, 32a are metal plates of, e.g., stainless steel. For example, the first plate 30a and the second plate 32a are joined to each other by diffusion bonding, laser welding, brazing, or the like.

The first plate 30a has a substantially flat plate, and includes a first fuel gas supply section 36. A fuel gas supply passage 34 extends through the fuel gas supply section 36 for supplying the fuel gas in the stacking direction indicated by the arrow A. The first fuel gas supply section 36 is integral with a first sandwiching member 40 through a first bridge 38 extending outwardly from the first fuel gas supply section 36.

The first sandwiching member 40 and the electrolyte electrode assembly 26 have the same diameter, or the diameter of the first sandwiching member 40 is larger than the diameter of the electrolyte electrode assembly 26. A plurality of projections 42 are formed on a surface of the first sandwiching member 40 which contacts the anode 24. A fuel gas channel 44 for supplying the fuel gas along the electrode surface of the anode 24 is formed by the projections 42. The projections 42 have a current collection function. A fuel gas inlet 46 for supplying the fuel gas to a central region of the anode 24 is formed at the center of the first sandwiching member 40.

The second plate 32a has a second fuel gas supply section 48, and the fuel gas supply passage 34 extends through the second fuel gas supply section 48. The second fuel gas supply section 48 is integral with a second sandwiching member 52 through a second bridge 50, extending outwardly from the second fuel gas supply section 48. A circumferential ridge 54 is provided annularly on an outer circumferential portion of the second plate 32a. The circumferential ridge 54 protrudes toward the first plate 30a, and the circumferential ridge 54 is joined to the first plate 30a.

A plurality of protrusions 56 are formed on surfaces of the second fuel gas supply section 48, the second bridge 50 and the second sandwiching member 52 facing the first plate 30a so as to contact the first plate 30a.

A fuel gas supply channel 58 connected to the fuel gas supply passage 34 is formed between the first bridge 38 and the second bridge 50. The fuel gas supply channel 58 is connected to the fuel gas inlet 46 through a fuel gas filling chamber 60 formed between the first and second sandwiching members 40, 52.

The first separator 28*a* and the second separator 28*b* have the same shape. The second separator 28*b* includes a first plate 30*b* and a second plate 32*b* corresponding respectively to the first plate 30*a* and the second plate 32*a*. The first plate 30*b* and the second plate 32*b* have first and second oxygen-containing gas supply sections 64, 66. An oxygen-containing gas supply passage 62 extends through the first and second oxygen-containing gas supply sections 64, 66 for supplying the oxygen-containing gas in the stacking direction.

In the first plate 30*b* and the second plate 32*b*, the first and second oxygen-containing gas supply sections 64, 66 are integral with first and second sandwiching members 72, 74 through first and second bridges 68, 70 extending outwardly from the first and second oxygen-containing gas supply sections 64, 66, respectively.

On the surface of the first sandwiching member 72 which contacts the cathode 22, an oxygen-containing gas channel 76 for supplying an oxygen-containing gas along the electrode surface of the cathode 22 is formed by the projections 42. An oxygen-containing gas inlet 78 for supplying the oxygen-containing gas to a central region of the cathode 22 is formed at the center of the first sandwiching member 72.

The second plate 32*b* is joined to the first plate 30*b* to form an oxygen-containing gas supply channel 80 between the first and second bridges 68, 70. The oxygen-containing gas supply channel 80 is connected to the oxygen-containing gas supply passage 62. An oxygen-containing gas filling chamber 82 is formed in the second sandwiching section 74. The oxygen-containing gas supply passage 62 is connected to the oxygen-containing gas filling chamber 82 through the oxygen-containing gas supply channel 80.

As shown in FIG. 3, in the first separator 28*a*, the first and second fuel gas supply sections 36, 48 form a fuel gas supply section 84, the first and second bridges 38, 50 form a first bridge section 86, and the first and second sandwiching members 40, 52 form a first sandwiching section 88. In the second separator 28*b*, the first and second oxygen-containing gas supply sections 64, 66 form an oxygen-containing gas supply section 90, and the first and second bridges 68, 70 form a second bridge section 92, and the first and second sandwiching members 72, 74 form a second sandwiching section 94.

At each of the fuel gas supply sections 84 of a pair of the first separators 28*a* that are adjacent to each other in the stacking direction indicated by the arrow A, a first displacement absorbing mechanism (fuel gas side displacement absorbing mechanism) 96 for absorbing displacement generated in the fuel cell stack 10 in the stacking direction is provided, and at each of the oxygen-containing gas supply sections 90 of a pair of the second separators 28*b* that are adjacent to each other in the stacking direction indicated by the arrow A, a second displacement absorbing mechanism (oxygen-containing gas side displacement absorbing mechanism) 98 for absorbing displacement generated in the stacking direction is provided.

Figure 6:
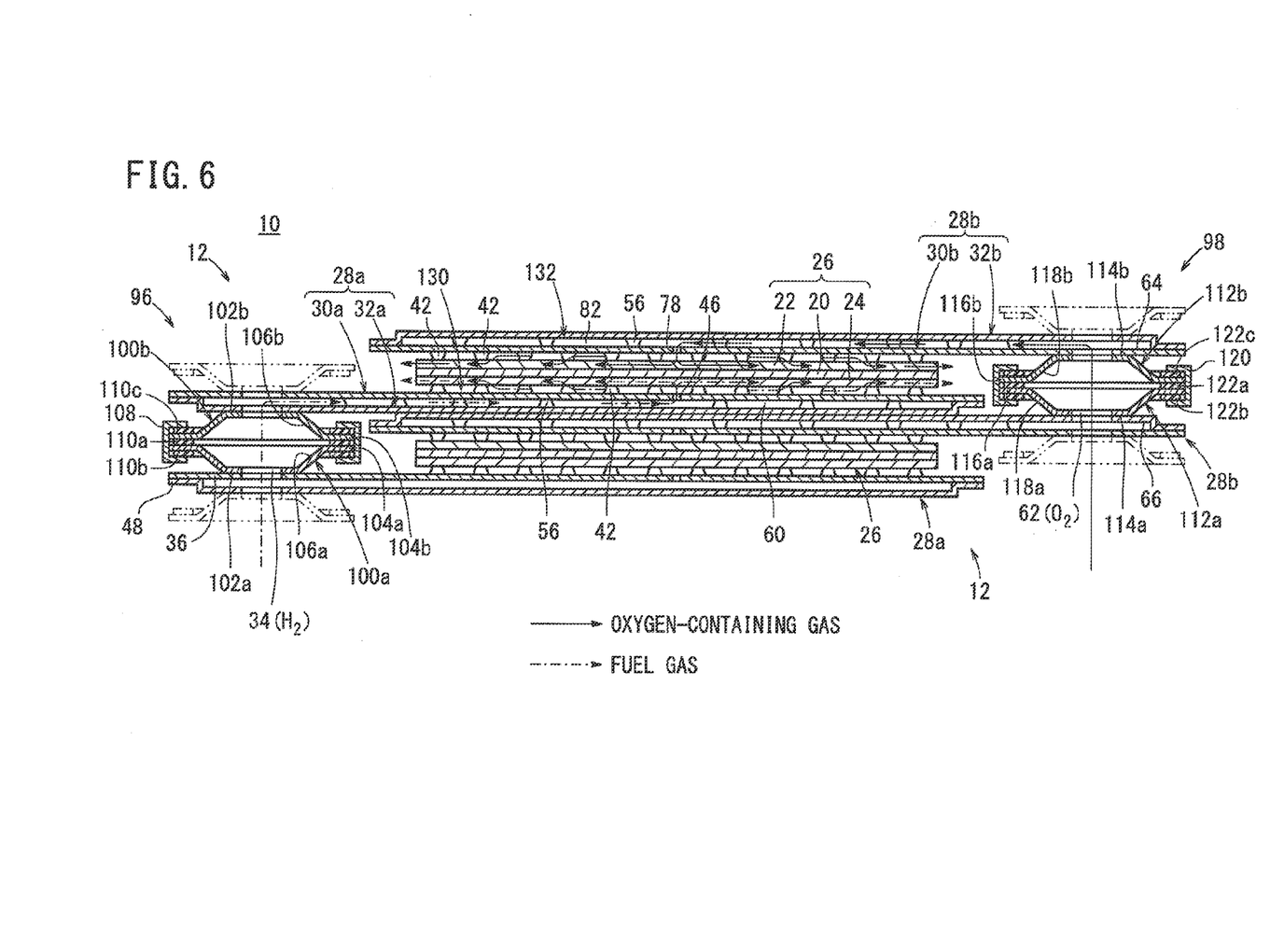
FIG. 6 is a cross sectional view showing the fuel cell stack, taken along a line VI-VI in FIG. 3.

As shown in FIGS. 4 and 6, in the first and second plates 30*a*, 32*a* of the first separator 28*a*, the first displacement absorbing mechanism 96 includes coupling members 100*a*, 100*b* fixed to the first and second fuel gas supply sections 36, 48, on surfaces thereof that are opposite to the protrusions 56, e.g., by welding. The coupling members 100*a*, 100*b* couple the fuel gas supply sections 84 of the pair of first separators 28*a* that are adjacent to each other in the stacking direction. The coupling members 100*a*, 100*b* have spring property for absorbing the load in the stacking direction. For example, the coupling members 100*a*, 100*b* are thin metal plates of, e.g., stainless, and have a substantially bellows shape.

As shown in FIG. 6, the coupling member 100*a* includes a separator joint portion 102*a* welded (joined) to the first fuel gas supply section 36 of the first plate 30*a*, an engagement portion 104*a* for engagement of the coupling members 100*a*, 100*b* that are adjacent to each other in the stacking direction, and a coupling portion 106*a* connecting the separator joint portion 102*a* and the engagement portion 104*a*. The coupling portion 106*a* has spring property. The coupling portion 106*a* is inclined in a direction away from the first fuel gas supply section 36, and the engagement portion 104*a* extends in a horizontal direction.

The coupling member 100*b* includes a separator joint portion 102*b* welded (joined) to the second fuel gas supply section 48 of the second plate 32*a*, an engagement portion 104*b* for engagement of the coupling members 100*a*, 100*b* that are adjacent to each other in the stacking direction, and a coupling portion 106*b* connecting the separator joint portion 102*b* and the engagement portion 104*b*. The coupling portion 106*b* has spring property. The coupling portion 106*b* is inclined in a direction away from the second fuel gas supply section 48, and the engagement portion 104*b* extends in a horizontal direction.

As shown in FIG. 4, the first displacement absorbing mechanism 96 includes joint members 108 for joining the pair of coupling members 100*a*, 100*b* together, and three seal members 110*a*, 110*b* and 110*c* are inserted at positions corresponding to an area where the coupling members 100*a*, 100*b* are engaged with each other, and areas where the coupling members 100*a*, 100*b* and the joint members 108 are engaged with each other.

The joint member 108 has a U-shape in cross section, and for example, three joint members 108 are arranged in a ring shape as a whole. As shown in FIG. 6, each of the joint members 108 is opened on the inner circumferential side, and a stack body made up of the seal member 110*b*, the engagement portion 104*a* of the coupling member 100*a*, the seal member 110*a*, the engagement portion 104*b* of the coupling member 100*b*, and the seal member 110*c* are inserted from this inner circumferential side to crimp these components by the joint members 108.

The seal members 110*a* to 110*c* has a ring shape, and are made of material having a gas sealing function and an insulating function, and more preferably also having heat resistance property and flexibility. Specifically, the seal members 110*a* to 110*c* are thin membrane seals of clay membrane, made of composite material of clay mineral and organic polymer. However, the present invention is not limited in this respect. For example, glass-base seal members may be used as the seal members 110*a* to 110*c*.

In the second and first plates 32*b*, 30*b* of the second separator 28*b*, the second displacement absorbing mechanism 98 includes coupling members 112*a*, 112*b* fixed to the second and first oxygen-containing gas supply sections 66, 64, on surfaces thereof that are opposite to the protrusions 56, e.g., by welding. The coupling members 112*a*, 112*b* couple the oxygen-containing gas supply sections 90 of a pair of the second separators 28*b* that are adjacent to each other in the stacking direction, and have spring property for absorbing the load in the stacking direction.

As shown in FIG. 6, the coupling member 112*a* includes a separator joint portion 114*a* welded (joined) to a second oxygen-containing gas supply section 66 of the second plate 32*b*, an engagement portion 116*a* for engagement of the coupling members 112*a*, 112*b* that are adjacent to each other in the stacking direction, and a coupling portion 118*a* connecting the separator joint portion 114*a* and the engagement portion 116*a*. The coupling portion 118*a* has spring property.

The coupling portion 118a is inclined in a direction away from the second oxygen-containing gas supply section 66, and the engagement portion 116a extends in a horizontal direction.

The coupling member 112b includes a separator joint portion 114b welded (joined) to the first oxygen-containing gas supply section 64 of the first plate 30b, an engagement portion 116b for engagement of the coupling members 112a, 112b that are adjacent to each other in the stacking direction, and a coupling portion 118b connecting the separator joint portion 114b and the engagement portion 116b. The coupling portion 118b has spring property. The coupling portion 118b is inclined in a direction away from the first oxygen-containing gas supply section 64, and the engagement portion 116b extends in a horizontal direction.

As shown in FIG. 4, the second displacement absorbing mechanism 98 includes joint members 120 for joining the pair of coupling members 112a, 112b together, and three seal members 122a, 122b and 122c are inserted at positions corresponding to an area where the coupling members 112a, 112b are engaged with each other, and areas where the coupling members 112a, 112b and the joint members 120 are engaged with each other.

The joint member 120 has a U-shape in cross section, and for example, the three joint members 120 are arranged in a ring shape as a whole. As shown in FIG. 6, each of the joint members 120 is opened on the inner circumferential side, and a stack body made up of the seal member 122b, the engagement portion 116a of the coupling member 112a, the seal member 122a, the engagement portion 116b of the coupling member 112b, and the seal member 122c are inserted from this inner circumferential side to crimp these components by the joint members 120.

The seal members 122a to 122c have a ring shape, and are made of material having a gas sealing function and an insulating function, and more preferably also having heat resistance property and flexibility. Specifically, the seal members 122a to 122c are thin membrane seals of clay membrane, made of composite material of clay mineral and organic polymer. However, the present invention is not limited in this respect. For example, glass-base seal members may be used as the seal members 122a to 122c.

As shown in FIGS. 3 and 6, a third displacement absorbing mechanism (fuel gas side displacement absorbing mechanism) 130 for absorbing displacement that occurs in the fuel cell stack 10 in the stacking direction is provided in the first sandwiching section 88 of the first separator 28a, and a fourth displacement absorbing mechanism (oxygen-containing gas side displacement absorbing mechanism) 132 for absorbing displacement in the stacking direction is provided in the second sandwiching section 94 of the second separator 28b.

As shown in FIGS. 4 and 6, the displacement absorbing mechanism 130 of the first sandwiching section 88 includes a fuel gas filling chamber 60 formed between the first sandwiching member 40 and the second sandwiching member 52, a plurality of projections 42 provided in the first plate 30a facing the electrolyte electrode assembly 26 to form the fuel gas channel 44, and a plurality of protrusions 56 provided in the second plate 32a so as to contact the first plate 30a. The projections 42 and the protrusions 56 are not overlapped with each other in the stacking direction.

Figure 7:
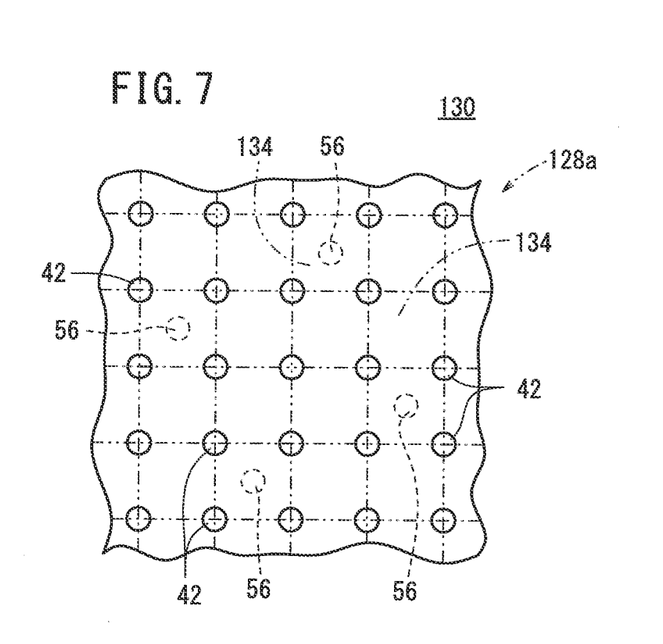
FIG. 7 is an enlarged view showing a displacement absorbing mechanism of the fuel cell stack.

As shown in FIG. 7, the projections 42 are arranged in a matrix pattern and four projections 42 form a single unit area 134. One protrusion 56 is provided in one single unit area 134, and no protrusions 56 are provided in other unit areas 134 adjacent to the one unit area 134, i.e., in eight unit areas 134 around the one unit area 134 where the protrusion 56 is provided. It should be noted that various layouts can be adopted for the projections 42 and the protrusions 56.

As shown in FIGS. 4 and 6, the displacement absorbing mechanism 132 of the second sandwiching section 94 includes an oxygen-containing gas filling chamber 82, a plurality of projections 42 provided in the first plate 30b to form the oxygen-containing gas channel 76, and a plurality of protrusions 56 provided in the second plate 32b to contact the first plate 30b. The projections 42 and the protrusions 56 are not overlapped with each other in the stacking direction.

Figure 8:
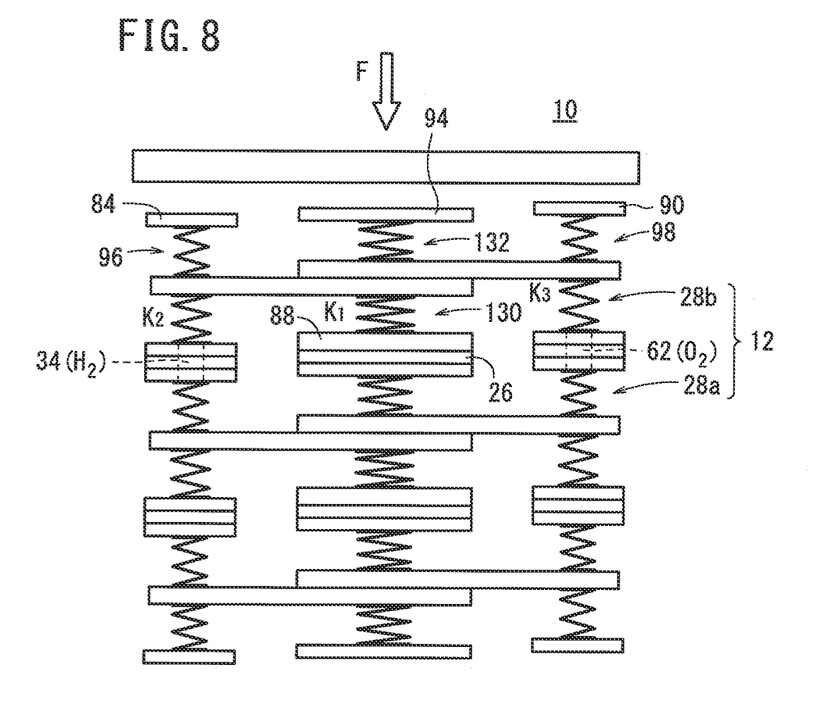
FIG. 8 is an explanatory view of each displacement absorbing mechanism of the fuel cell stack.
Figure 9:
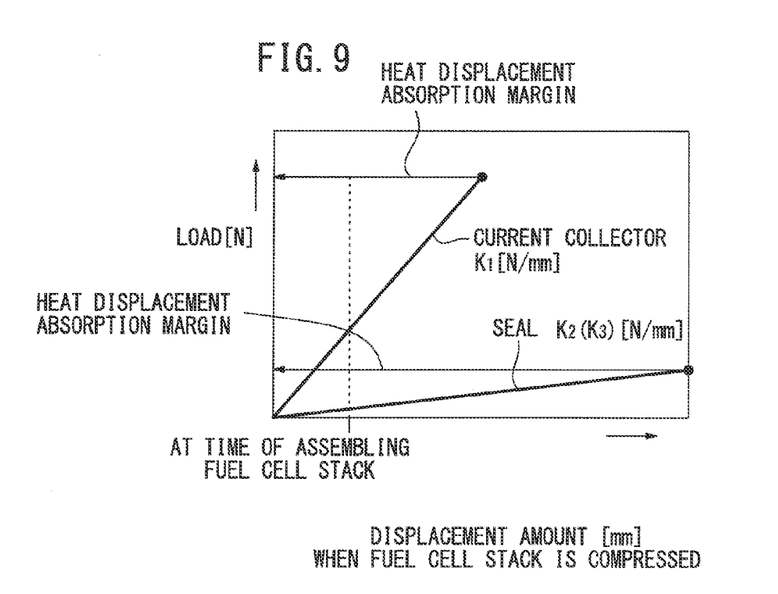
FIG. 9 is an explanatory view of rigidity of the displacement absorbing mechanisms at current collectors and at seals.

As schematically shown in FIG. 8, the rigidity K1 of the current collectors (third displacement absorbing mechanism 130 and fourth displacement absorbing mechanism 132), the rigidity K2 of the fuel-gas-side seal (first displacement absorbing mechanism 96), and the rigidity K3 of the oxygen-containing-gas-side seal (second displacement absorbing mechanism 98) are determined. Specifically, the rigidity K2 is smaller than the rigidity K1 (K2<K1), and the rigidity K3 is smaller than the rigidity K1 (K3<K1). As shown in FIG. 9, the rigidity K1 of the current collectors and the rigidities K2 and K3 of the seals (fuel gas seal and oxygen-containing gas seal) can be determined in a range where the current collectors and the seals are displaced suitably in response to the applied load. Thus, the current collectors and the seals have a heat displacement absorption margin between a state where no load is applied to the first to fourth displacement absorbing mechanisms 96, 98, 130, 132 and a state where the current collectors and the seals are displaced to the maximum degree. The heat displacement absorption margin on the seal side is large in comparison with the heat displacement absorption margin on the current collector side. For example, the rigidities K2, K3 of the seals are set to be not more than 1/10 of the rigidity K1 of the current collectors.

Black circles in FIG. 9 show the maximum displacement amounts when the fuel cell stack 10 is compressed under pressure. The black circles indicate a state where there is no margin for absorbing heat displacement or the like, and in such a state, a load applied in the stacking direction is directly transmitted. However, the displacement amounts at the time of assembling the fuel cell stack 10 can be set freely as long as they are within a range of the heat displacement absorption margins of the current collectors and the seals. For example, in the case where it is likely that the displacement amounts become significantly large because the fuel cell stack 10 is heated rapidly, if the displacement amounts at the time of assembling the fuel cell stack 10 are small, the larger displacement amounts can be obtained. Further, in the case where variation may occur in the displacement amounts of the separators due to degradation or the like, if the displacement amounts at the time of assembling the fuel cell stack 10 are large, then the fuel cell stack 10 can be adapted to increase and decrease in the displacement amounts of the components, and thus a desired load can be applied to the fuel cell stack 10 all the time.

As shown in FIG. 8, when a load F is applied to the fuel cell stack 10 in the stacking direction, a load applied to the current collectors is F×K1/(K1+K2+K3), a load applied to the fuel-gas-side seal is F×K2/(K1+K2+K3), and a load applied to the oxygen-containing-gas-side seal is F×K3/(K1+K2+K3).

As shown in FIGS. 1 and 2, a first pole 140 is connected to the first plate member 14a to form one current collection port. A second pole 142 is connected to the second plate member 14b to form the other current collection port. The first pole 140 and the second pole 142 extend in parallel to each other, and function as current terminals.

Operation of the fuel cell stack 10 will be described below.

Firstly, as shown in FIGS. 3 and 5, the fuel gas (hydrogen gas) is supplied to the fuel gas supply passage 34 of the fuel cell stack 10, and the oxygen-containing gas (air) is supplied to the oxygen-containing gas supply passage 62 of the fuel cell stack 10.

The fuel gas flows in the stacking direction indicated by the arrow A, and the fuel gas flows into the fuel gas supply channel 58 formed in the first separator 28a of each fuel cell 12. The fuel gas flows along the fuel gas supply channel 58 between the first and second bridges 38, 50, and the fuel gas is temporarily filled in the fuel gas filling chamber 60.

Then, the fuel gas flows through the fuel gas inlet 46 into the fuel gas channel 44. In each of the electrolyte electrode assemblies 26, the fuel gas inlet 46 is provided at a central position of the anode 24. In the structure, the fuel gas flows along the fuel gas channel 44 from the center of the anode 24 toward the outer circumferential portion of the anode 24.

On the other hand, the oxygen-containing gas supplied to the oxygen-containing gas supply passage 62 flows along the oxygen-containing gas supply channel 80 formed between the first and second bridges 68, 70 of the second separator 28b, and the oxygen-containing gas is temporarily filled in the oxygen-containing gas filling chamber 82. Then, the oxygen-containing gas flows through the oxygen-containing gas inlet 78 into the oxygen-containing gas channel 76.

In each of the electrolyte electrode assemblies 26, the oxygen-containing gas inlet 78 is provided at a central position of the cathode 22. In the structure, the oxygen-containing gas flows along the oxygen-containing gas channel 76 from the center of the cathode 22 toward the outer circumferential portion of the cathode 22.

Thus, in each of the electrolyte electrode assemblies 26, the fuel gas flows from the center to the outer circumferential portion on the electrode surface of the anode 24, and the oxygen-containing gas flows from the center to the outer circumferential portion on the electrode surface of the cathode 22. At this time, oxide ions permeate through the electrolyte 20 toward the anode 24 for generating electricity by electrochemical reactions.

The fuel gas consumed when it moved through the fuel gas channel 44, and the oxygen-containing gas consumed when it moved through the oxygen-containing gas channel 76 are discharged from the outer circumferential portion of each electrolyte electrode assembly 26, and mixed in an area around the outer circumferential portion. Then, the mixed gas is discharged as an exhaust gas having a relatively high temperature.

In the present embodiment, the first displacement absorbing mechanism 96, the second displacement absorbing mechanism 98, the third displacement absorbing mechanism 130, and the forth displacement absorbing mechanism 132 for absorbing displacement generated in the fuel cell stack 10 are provided in the fuel gas supply sections 84, the oxygen-containing gas supply sections 90, the first sandwiching sections 88, and the second sandwiching sections 94, respectively.

In the structure, rapid displacement that occurs in the fuel cell stack 10 when the temperature is raised rapidly can be absorbed effectively by the entire fuel cell stack 10 through the first displacement absorbing mechanism 96, the second displacement absorbing mechanism 98, the third displacement absorbing mechanism 130, and the forth displacement absorbing mechanism 132. Therefore, generation of distortion in the fuel cell stack 10 is suppressed, and a desired current collection performance and a desired sealing performance can be maintained suitably.

Further, the first separator 28a and the second separator 28b has the same shape, and include the first plates 30a, 30b, and the second plates 32a, 32b that are joined together. In the structure, no dedicated separators are required for the first separator 28a and the second separator 28b. The number of components can be reduced economically.

Further, as shown in FIGS. 1 and 2, at the end of the fuel cell stack 10 in the stacking direction, the load applying mechanism 16 is provided for applying a load in the stacking direction to the first sandwiching sections 88, the second sandwiching sections 94, the fuel gas supply sections 84, and the oxygen-containing gas supply sections 90. The load applying mechanism 16 is overlapped with respect to the first sandwiching section 88 and the second sandwiching section 94 in the stacking direction. In the structure, by the spring member 18 of the single load applying mechanism 16, a load can be applied to the first sandwiching sections 88, the second sandwiching sections 94, the fuel gas supply sections 84, and the oxygen-containing gas supply sections 90 in the stacking direction. Thus, a simplified structure is achieved easily.

Further, the rigidity K1 of the current collectors (third displacement absorbing mechanism 130 and fourth displacement absorbing mechanism 132) is higher than the rigidity K2 of the fuel-gas-side seal and the rigidity K3 of the oxygen-containing-gas-side seal. In the structure, a large load can be transmitted to the first sandwiching section 88 and the second sandwiching section 94. The high contact rate at the current collectors is obtained, and improvement in the power generation performance is achieved reliably.

Further, the third displacement absorbing mechanism 130 of the first sandwiching section 88 includes the fuel gas filling chamber 60, the projections 42, and the protrusions 56. The fuel gas filling chamber 60 is formed between the first plate 30a and the second plate 32a that are joined together, and the fuel gas supplied from the fuel gas supply section 84 is introduced into the fuel gas filling chamber 60. The projections 42 are provided on the first plate 30a facing the electrolyte electrode assembly 26, and form the fuel gas channel 44. The protrusions 56 are provided on the second plate 32a so as to contact the first plate 30a.

The fourth displacement absorbing mechanism 132 of the second sandwiching section 94 includes the oxygen-containing gas filling chamber 82, the projections 42, and the protrusions 56. The oxygen-containing gas filling chamber 82 is formed between the first plate 30b and the second plate 32b that are joined together, and the oxygen-containing gas supplied from the oxygen-containing gas supply section 90 is introduced into the oxygen-containing gas filling chamber 82. The projections 42 are provided on the first plate 30a facing the electrolyte electrode assembly 26, and form the oxygen-containing gas channel 76. The protrusions 56 are provided on the second plate 32b so as to contact the first plate 30b.

The projections 42 and the protrusions 56 are positioned such that they are not overlapped with each other in the stacking direction (see FIG. 6). Therefore, in the first plates 30a, 30b, areas between the projections 42 and the protrusions 56 are flexibly deformed easily. In the structure, the rigidity of the current collectors becomes low, and it becomes possible to suitably absorb heat displacement, in particularly, at the time of starting operation thereof rapidly.

Thus, improvement in the durability against damage of the electrolyte electrode assemblies 26 is achieved. The contact area can be increased by being conformed with height variation in each stage of the fuel cell stack 10 and undulation of the electrolyte electrode assemblies 26. It becomes possible to reduce the requirement for the machining accuracy in the stacking direction. Further, a load required for current collection can be reduced, and the size reduction of the load applying mechanism 16 is achieved easily.

Further, the first displacement absorbing mechanism 96 provided in the fuel gas supply section 84 includes a pair of coupling members 100a, 100b for coupling the pair of fuel gas supply sections 84 that are adjacent to each other in the stacking direction, the coupling members 100a, 100b having spring property for absorbing a load applied in the stacking direction, and also includes the seal members 110a, 110b and 110c for preventing leakage of the fuel gas from the fuel gas supply section 84.

Further, the second displacement absorbing mechanism 98 provided in the oxygen-containing gas supply section 90 includes a pair of coupling members 112a, 112b for coupling the pair of oxygen-containing gas supply sections 90 that are adjacent to each other in the stacking direction, the coupling members 112a, 112b having spring property for absorbing a load applied in the stacking direction, and also includes the seal members 122a, 122b and 122c for preventing leakage of the oxygen-containing gas from the oxygen-containing gas supply section 90.

Thus, since the coupling members 100a, 100b are deformed flexibly in the first separator 28a, the displacement amount in the stacking direction is absorbed. Thus, a desired sealing performance is secured, and rapid displacement caused when the temperature is raised rapidly can be absorbed effectively. As a result, generation of distortion in the first separator 28a is suppressed, and damage of the fuel gas supply section 84 and the oxygen-containing gas supply section 90 can be prevented as much as possible. Further, a load in the stacking direction can be absorbed by flexible deformation of the coupling members 100a, 100b. In the structure, dimension errors in the first separator 28a in the stacking direction can be absorbed suitably.

Also in the second separator 28b, the same advantages as in the case of the first separator 28a can be obtained.

Additionally, while the fuel cell 12 is provided in each stage of the fuel cell stack 10 in the stacking direction, even if it becomes impossible for a certain displacement absorbing mechanism in a certain stage to absorb displacement due to degradation or the like, since the displacement can be absorbed by the other displacement absorbing mechanisms in the other stages, the operation and advantages as described above can be obtained.

Although a certain preferred embodiment of the present invention has been shown and described in detail, it should be understood that various changes and modifications may be made to the embodiment without departing from the scope of the invention as set forth in the appended claims.

The invention claimed is:
1. A fuel cell stack formed by stacking a plurality of fuel cells in a stacking direction, the fuel cells each being formed by sandwiching an electrolyte electrode assembly between a first separator and a second separator, the electrolyte electrode assembly including an anode, a cathode, and an electrolyte interposed between the anode and the cathode,
   the first separator formed of only a first separator first plate and a first separator second plate which are joined together, the first separator including only:
     a first sandwiching section for sandwiching the electrolyte electrode assembly, a fuel gas channel for supplying a fuel gas along an electrode surface being formed in the first sandwiching section;
     a fuel gas supply section, a fuel gas supply passage for supplying the fuel gas to the fuel gas channel extending through the fuel gas supply section in the stacking direction; and
     a first bridge section connecting the first sandwiching section and the fuel gas supply section, a fuel gas supply channel being formed in the first bridge section for supplying the fuel gas from the fuel gas supply passage to the fuel gas channel;
   the second separator formed of only a second separator first plate and a second separator second plate which are joined together, the second separator including only:
     a second sandwiching section for sandwiching the electrolyte electrode assembly, an oxygen-containing gas channel for supplying an oxygen-containing gas along an electrode surface being formed in the second sandwiching section;
     an oxygen-containing gas supply section, an oxygen-containing gas supply passage for supplying the oxygen-containing gas to the oxygen-containing gas channel extending through the oxygen-containing gas supply section in the stacking direction; and
     a second bridge section connecting the second sandwiching section and the oxygen-containing gas supply section, an oxygen-containing gas supply channel being formed in the second bridge section for supplying the oxygen-containing gas from the oxygen-containing gas supply passage to the oxygen-containing gas channel,
   wherein a displacement absorbing mechanism for absorbing displacement generated in the fuel cell stack is formed in each of the first sandwiching section, the second sandwiching section, the fuel gas supply section, and the oxygen-containing gas supply section,
   wherein the displacement absorbing mechanism formed in the first sandwiching section includes:
     a fuel gas filling chamber formed between the first separator first plate and the first separator second plate that are joined together, the fuel gas supplied from the fuel gas supply section being introduced into the fuel gas filling chamber;
     a plurality of first projections provided on the first separator first plate facing the electrolyte electrode assembly, the first projections forming the fuel gas channel; and
     a plurality of first protrusions provided on the first separator second plate so as to contact the first separator first plate,
   wherein the displacement absorbing mechanism formed in the second sandwiching section includes:
     an oxygen-containing gas filling chamber formed between the second separator first plate and the second separator second plate that are joined together, the oxygen-containing gas supplied from the oxygen-containing gas supply section being introduced into the oxygen-containing gas filling chamber;
     a plurality of second projections provided on the second separator first plate facing the electrolyte electrode assembly, the second projections forming the oxygen-containing gas channel; and
     a plurality of second protrusions provided on the second separator second plate so as to contact the second separator first plate,
   wherein the first projections and the first protrusions are not overlapped with each other in the stacking direction, and the second projections and the second protrusions are not overlapped with each other in the stacking direction, and wherein the first separator and the second separator have a same shape.

2. The fuel cell stack according to claim 1, wherein at an end of the fuel cell stack in the stacking direction, a load applying mechanism is provided for applying a load in the stacking direction to the first sandwiching section, the second sandwiching section, the fuel gas supply section and the oxygen-containing gas supply section, and the load applying mechanism is overlapped with respect to the first sandwiching section and the second sandwiching section in the stacking direction.

3. The fuel cell stack according to claim 1, wherein a rigidity of the displacement absorbing mechanism formed in the first sandwiching section and a rigidity of the displacement absorbing mechanism formed in the second sandwiching section are higher than a rigidity of the displacement absorbing mechanism formed in the fuel gas supply section and a rigidity of the displacement absorbing mechanism formed in the oxygen-containing gas supply section.

4. The fuel cell stack according to claim 1, wherein the displacement absorbing mechanism formed in the fuel gas supply section includes:

a pair of fuel gas supply section coupling members for coupling a pair of the fuel gas supply sections that are adjacent to each other in the stacking direction, the fuel gas supply section coupling members having spring property for absorbing a load applied in the stacking direction; and a fuel gas supply section seal member for preventing leakage of the fuel gas from the fuel gas supply section, and wherein the displacement absorbing mechanism formed in the oxygen-containing gas supply section includes:

a pair of oxygen-containing gas supply section coupling members for coupling a pair of the oxygen-containing gas supply sections that are adjacent to each other in the stacking direction, the oxygen-containing gas supply section coupling members having spring property for absorbing a load applied in the stacking direction; and a oxygen-containing gas supply section seal member for preventing leakage of the oxygen-containing gas from the oxygen-containing gas supply section.

* * * * *